Oct. 11, 1949.

L. F. KLINK 2,484,171

CRYPTOGRAM MACHINE

Filed Jan. 10, 1946

*INVENTOR.*

LEON F. KLINK

ATTORNEYS

Oct. 11, 1949.	L. F. KLINK	2,484,171
CRYPTOGRAM MACHINE

Filed Jan. 10, 1946	2 Sheets-Sheet 2

INVENTOR.

LEON F. KLINK

BY *Victor J. Evans & Co.*

ATTORNEYS

Patented Oct. 11, 1949

2,484,171

UNITED STATES PATENT OFFICE 2,484,171

CRYPTOGRAM MACHINE

Leon F. Klink, Medford, Oreg.

Application January 10, 1946, Serial No. 640,338

1 Claim. (Cl. 35—2)

This invention relates to a cryptogram device which will enable the user thereof to quickly and accurately code and decode a message.

An object of the invention is to provide a device of this type which is simple and durable in construction, reliable and efficient in operation and being composed of comparatively few parts is economical to manufacture.

With the above and other objects and advantages in view the invention consists of the novel details of construction, arrangement and combination of parts, more fully hereinafter described, claimed and illustrated in the accompanying drawings in which:

Figure 1:
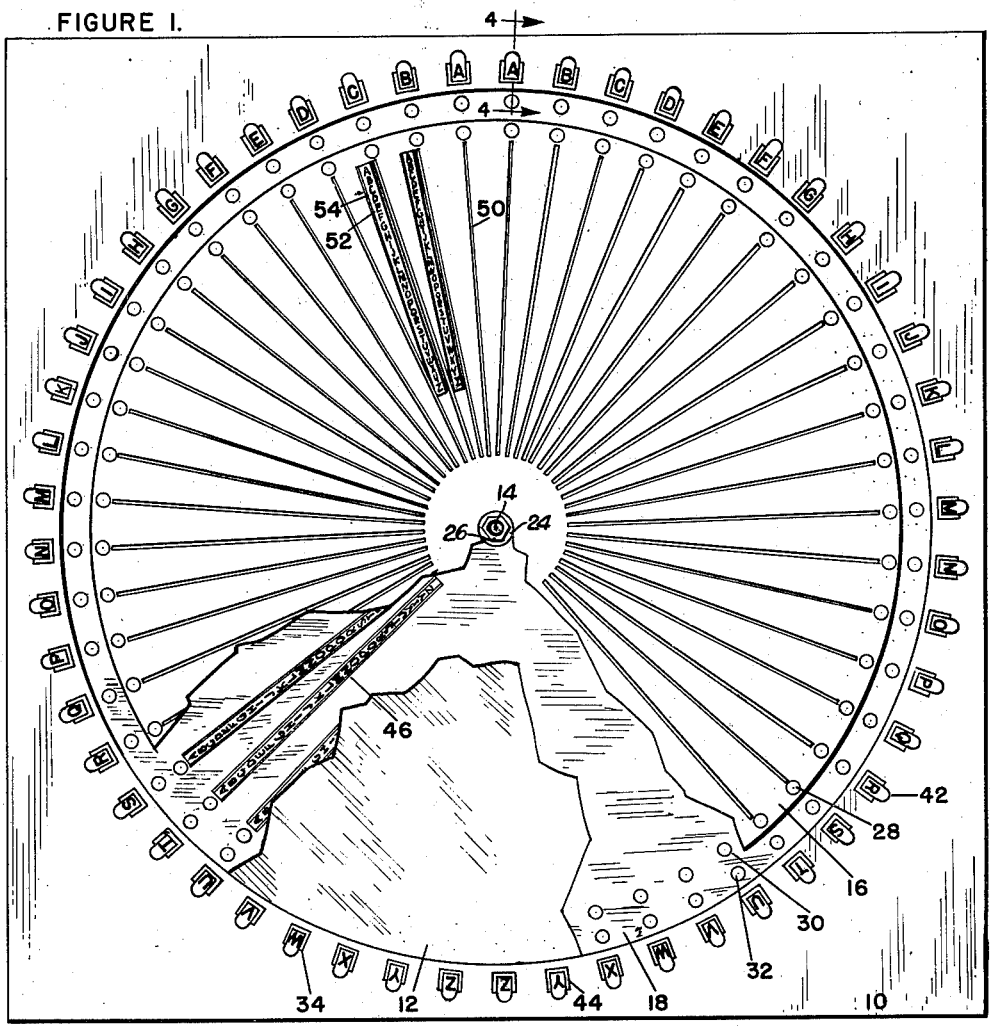
Figure 1 is a plan view of an embodiment of the invention.
Figure 4:
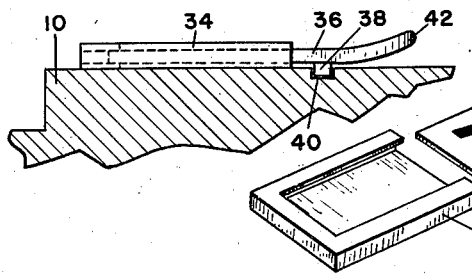
Figure 4 is a sectional view on the line 4—4 of Figure 1.
Figure 5:
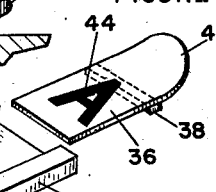
Figure 5 is a perspective view of one of the letter holders.
Figure 2:
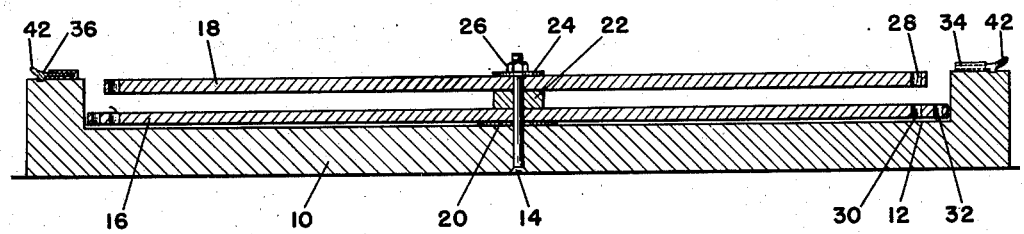
Figure 2 is a sectional view thereof.
Figure 3:
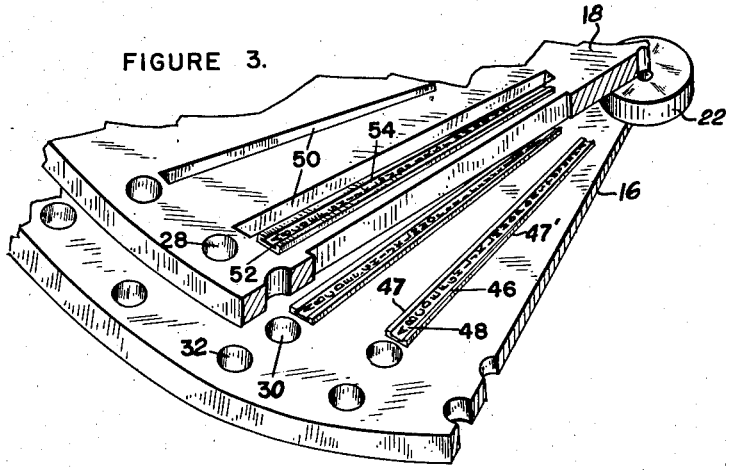
Figure 3 is an enlarged detailed perspective sectional view of the device.
Figure 8:
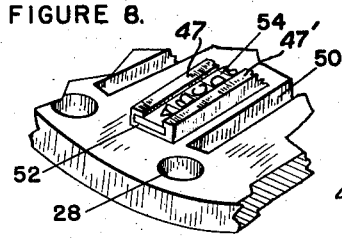
Figure 8 is a fragmentary prospective view of the bar applied to one of the disc members.
Figure 6:
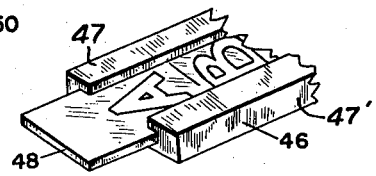
Figure 6 is a fragmentary detailed perspective view of one of the letter slide bars.
Figure 7:
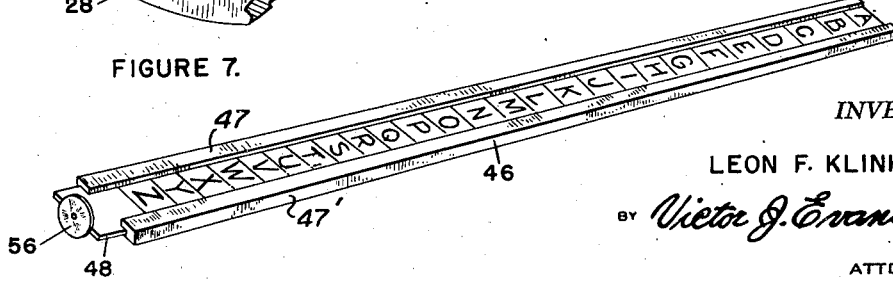
Figure 7 is a perspective view of the bar complete.

Referring more in detail to the drawings the reference numeral 10 designates the substantially square shaped base which is provided with the circular recess 12, having the medial pivot pin 14 on which are rotatably mounted the lower and upper discs 16 and 18 respectively. The disc 16 is spaced from the bottom of the recess by a washer 20 and a bushing 22 spaces the two discs from each other and a washer 24 resting on the upper disc retains the discs on the pin 14 by means of the nut 26.

Disc 18 is provided with fifty two openings 28 adjacent the marginal periphery thereof and the disc 16 is provided with the same number of openings 30 in alinement with the openings 28. The openings in both discs are spaced and the openings 30 are in alinement in the same plane with openings 32 which are positioned adjacent the marginal periphery of the disc 16 which being of a larger diameter than disc 18 extends beyond the periphery of disc 16.

Positioned on the base 10 adjacent the periphery of the recess 12 in alinement with the openings 28, 30 and 32 are the pockets 34 which are adapted to receive the removable tabs 36 having lugs 38 thereon adapted to be received in seats 40 in the base to lock the tabs in the pockets. The tabs have upturned ends 42 and are provided with respectively different letters of the alphabet 44 and there are fifty-two pockets corresponding with the number of openings.

Positioned on the disc 16 in alinement with the openings 30 and 32 and extending radially from the center of the disc are guide pockets 46 which are provided with interiorly grooved upstanding flanges 47 and 47' that are adapted to receive removable letters slides 48 and radial slots 50 in the disc 18 in alinement with openings 28 permit viewing of the letters 48 on the disc 16 and adjacent the slots 50 guide pockets 52 are provided on disc 18 to receive the removable letters 54. The letter slides in the pockets are provided with discs 56 on the end thereof to retain the letters in place.

Thus by rearranging the letters in the pocket and the letters in the slide the message may be decoded by using the pockets on the base to form the message and having the slide letters on the discs rotated until the letters correspond to decode the message.

Since the art of decoding messages is a scientific art which cannot be thoroughly discussed with regard to the present structure it is believed that the structure of the device being apparent to those skilled in the art and the use thereof will also be apparent and it is not deemed necessary to further describe the operation thereof.

It is to be understood however, that changes in the details of construction, arrangement and combination of parts may be resorted to without departing from the spirit of the invention and the scope of the appended claim.

Having thus described the invention what is claimed as new and desired to be secured by Letters Patent is:

In a cryptogram device, a substantially square-shaped body, a circular recess in said body, superposed upper and lower discs rotatably mounted in said recess, a plurality of circular openings in said lower disc, a plurality of circular openings in said upper disc in alignment with said openings in said lower disc, a second set of circular openings in said lower disc positioned interiorly of said first named circular openings, a plurality of radially arranged guide pockets containing removable letters on said lower disc, a plurality of radially arranged openings in said upper disc to permit viewing said letters on said lower disc, a plurality of radially arranged guide pockets on said upper disc adjacent openings, said guide pockets containing removable letters, a plurality of guide pockets circumferentially arranged on said square shaped base body, and a plurality of removable letter slides positioned in said pockets, said slides being provided with upturned tabs, whereby they may be readily removed from said pockets.

LEON F. KLINK.

REFERENCES CITED

The following references are of record in the file of this patent:

UNITED STATES PATENTS

| Number | Name | Date |
|---|---|---|
| 625,188 | McKeighan | May 16, 1899 |
| 723,288 | Lewis | Mar. 24, 1903 |
| 723,340 | Tompkins | Mar. 24, 1903 |
| 1,139,329 | Birch | May 11, 1915 |
| 1,385,356 | Bates | July 26, 1921 |
| 1,410,342 | Newell | Mar. 21, 1922 |
| 1,586,960 | Bowen | June 1, 1926 |
| 1,659,543 | Vita | Feb. 14, 1928 |
| 2,313,012 | Garnier | Mar. 2, 1943 |

FOREIGN PATENTS

| Number | Country | Date |
|---|---|---|
| 522,825 | Great Britain | 1940 |